(12) United States Patent
Hsu et al.

(10) Patent No.: US 6,660,352 B2
(45) Date of Patent: Dec. 9, 2003

(54) ADHESIVE ELECTROSTATIC SHEETS

(75) Inventors: Chih-Chung Hsu, Woodbury, MN (US); Steven R. Austin, Oakdale, MN (US); Charles C. Lee, Little Canada, MN (US); Terry L. Morris, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 97 days.

(21) Appl. No.: 09/757,941

(22) Filed: Jan. 9, 2001

(65) Prior Publication Data

US 2002/0090480 A1 Jul. 11, 2002

(51) Int. Cl.⁷ .............................. B32B 3/06; B32B 31/04
(52) U.S. Cl. .................... 428/40.1; 40/593; 40/594; 40/611; 156/273.1; 156/267; 428/41.8; 428/42.1; 428/42.2; 428/203; 428/354
(58) Field of Search ................................ 428/40.1, 42.1, 428/42.2, 41.8, 203, 354; 156/273.1, 267; 40/593, 594, 611

(56) References Cited

U.S. PATENT DOCUMENTS

| | | |
|---|---|---|
| 3,301,741 A | 1/1967 | Henrickson et al. |
| 3,314,838 A | 4/1967 | Erwin |
| 3,554,835 A | 1/1971 | Morgan |
| 3,924,561 A | 12/1975 | Ruthart et al. |
| 3,967,022 A | 6/1976 | Hasei |
| 4,023,570 A | 5/1977 | Chinai et al. |
| 4,024,312 A | 5/1977 | Korpman |
| 4,054,697 A | 10/1977 | Reed et al. |
| 4,151,319 A | 4/1979 | Sackoff et al. |
| 4,226,910 A | 10/1980 | Dahlen et al. |
| 4,362,591 A | 12/1982 | Tracy |
| 4,376,151 A | 3/1983 | Parrotta |
| 4,556,595 A | 12/1985 | Ochi |
| 4,599,265 A | 7/1986 | Esmay |
| 4,735,837 A | 4/1988 | Miyasaka et al. |
| 4,862,944 A | 9/1989 | Hendershot |
| 5,008,139 A | 4/1991 | Ochi et al. |
| 5,010,671 A | 4/1991 | Stonehouse |
| 5,045,391 A | 9/1991 | Brandt et al. |
| 5,106,710 A | 4/1992 | Wang et al. |
| 5,114,520 A | 5/1992 | Wang, Jr. et al. |
| 5,141,790 A | 8/1992 | Calhoun et al. |
| 5,162,138 A * | 11/1992 | Caflisch .................. 428/17 |
| 5,207,581 A | 5/1993 | Boyd |
| 5,258,214 A | 11/1993 | Cooledge et al. |
| 5,262,259 A | 11/1993 | Chou et al. |
| 5,264,291 A | 11/1993 | Shinozaki |
| 5,296,277 A | 3/1994 | Wilson et al. |
| 5,307,579 A | 5/1994 | Clayton et al. |
| 5,358,094 A | 10/1994 | Molinaro et al. |
| 5,409,189 A | 4/1995 | Lühmann |
| 5,477,784 A | 12/1995 | Floegel |
| 5,488,455 A | 1/1996 | Cahill et al. |
| 5,507,464 A | 4/1996 | Hamerski et al. |
| 5,516,581 A | 5/1996 | Kreckel et al. |
| 5,655,446 A | 8/1997 | Watanabe |
| 5,672,402 A | 9/1997 | Kreckel et al. |
| 5,702,803 A | 12/1997 | Eisele et al. |
| 5,766,398 A | 6/1998 | Cahill et al. |
| 5,795,425 A | 8/1998 | Brault et al. |
| 5,795,636 A | 8/1998 | Keller et al. |
| 5,807,624 A | 9/1998 | Anderson et al. |
| 5,837,375 A | 11/1998 | Brault et al. |
| 5,888,615 A | 3/1999 | Mascarenhas et al. |
| 5,904,985 A | 5/1999 | Ward et al. |
| 5,922,159 A | 7/1999 | Cahill |
| 5,965,235 A | 10/1999 | McGuire et al. |
| 5,989,685 A | 11/1999 | Hockaday |
| 6,001,471 A | 12/1999 | Bries et al. |
| 6,004,642 A | 12/1999 | Langford |
| 6,023,870 A | 2/2000 | McGarrah |
| 6,162,534 A | 12/2000 | Hamerski |
| 6,258,200 B1 * | 7/2001 | Kassab .................. 156/273 |
| 6,284,339 B1 * | 9/2001 | Floegel .................. 428/43 |

FOREIGN PATENT DOCUMENTS

| | | |
|---|---|---|
| DE | 33 31 016 | 8/1983 |
| EP | 0 276 557 B1 | 4/1992 |
| EP | 0 279 579 B1 | 4/1993 |
| EP | 0 371 635 B1 | 7/1996 |
| GB | 1 541 311 | 2/1979 |
| JP | 56-80042 * | 7/1981 |
| WO | WO 85/04602 | 10/1985 |
| WO | WO 90/09278 | 8/1990 |
| WO | WO 91/06424 | 5/1991 |
| WO | WO 92/00361 | 9/1992 |
| WO | WO 95/06691 | 9/1995 |
| WO | WO 99/31193 | 6/1999 |
| WO | WO 99/65999 | 12/1999 |

* cited by examiner

*Primary Examiner*—Nasser Ahmad
(74) *Attorney, Agent, or Firm*—Dale A. Bjorkman; Carolyn V. Peters

(57) ABSTRACT

Electrostatically charged graphic sheets are additionally provided with a preapplied activatable adhesive. Such sheets may be oriented on a display substrate using the electrostatically induced adhesion, and more securely fastened to the display substrate using the activatable adhesive.

26 Claims, No Drawings

ADHESIVE ELECTROSTATIC SHEETS

FIELD OF THE INVENTION

The present invention relates to sheets that electrostatically adhere to substrates. More specifically, the present invention relates to sheets that adhere to substrates using a combination of electrostatic charge and an additional adhesive.

BACKGROUND OF THE INVENTION

Films have been provided with electrostatic charges, so that they will adhere to substrates without the use of adhesives. Films having persistent dielectric polarization are called electrets.

U.S. Pat. No. 5,258,214 discloses a preprinted thin plastic film wall covering having a preprinted image thereon and provided with a static electrical charge for securing the coverings to a surface.

U.S. Pat. No. 5,207,581 discloses a writing apparatus including electret film. The electret film, a flexible plastic film having a static electrical charge induced thereto, is capable of being erasably written upon with dry erase markers, as a writing medium. An apparatus is described for holding a roll of electret film.

U.S. Pat. No. 5,989,685 discloses an electret film composition adapted for printing on inkjet printers. This description provides an "improved printing material that incorporates the advantages of electrets (sic)" at column 2, lines 37–39. The advantages of electrets are stated at column 1, lines 53–55 to hold "the promise of providing a display which sticks to a surface without the use of fasteners or adhesives." The charged sheets of this invention are attached to a paper backing to avoid problems with handling of the sheets in the paper feed mechanisms of printers. These carrier backing papers are adhered to the sheets with a glued edge. Column 4, lines 24–52.

U.S. Pat. No. 5,807,624 discloses an electrostatically charged imaging manifold. The preferred imaging manifolds "comprise a transparent, polymeric sheet imageable in an imaging sheet, and attached thereto, an opaque member underlying and in register with said transparent sheet, said opaque member being adhered to said transparent polymeric sheet by means of the combination of an electrostatic charge and a pressure-sensitive adhesive." Column 3, lines 55–60. This adhesive is provided to provide additional protection against "scrunch," or to improve feeding performance of the sheet with the carrier paper. See column 12, line 66– column 13, line 2.

U.S. Pat. No. 6,023,870 describes an apparatus for displaying and replacing graphic sheet on vending machines, wherein graphics sheets are removably adhered to the reverse side of the clear display panel by static cling. An alternative embodiment is disclosed at column 7, lines 38–50, which describes the use of partial adhesive or reusable adhesive, defined as a "tacky" adhesive, for the removable adhering function. The adhesive described therein is the adhesive that is used on Post-it® brand notes from 3M, and particularly illustrating the tacky adhesive as SPRAY MOUNT® artist's adhesive from 3M, commercially available consumer applicable adhesive that can be applied on location. The specification further states that the principles of the various embodiments can be combined at Column 8, lines 32–36, giving the example that a tacky adhesive may secure the corners of a product graphics sheet that has been initially positioned using the method pertaining to static cling.

SUMMARY OF THE INVENTION

The present invention provides a graphic sheet comprising a film having a top and bottom surface. The film has an electrostatic charge and additionally contains a preapplied activatable adhesive. The electrostatic charge is sufficient to support the sheet on a vertical clean insulated surface. The activatable adhesive is capable of assisting in adhesion of the sheet to a display substrate.

DETAILED DESCRIPTION OF THE PRESENTLY PREFERRED EMBODIMENTS

As noted above, electrostatically charged sheets for application to various surfaces are known. The major advantage cited for these systems is the ability to adhere a sheet to an intended ultimate substrate without the use of adhesive. Thus, it was the primary objective in the prior art to avoid using an adhesive.

It has been found that over time that the charge in an electrostatically charged sheet will at least partially dissipate, and the adhesion of the sheet to the intended substrate will fail. This is particularly the case where sheets have been subjected to certain printing processes, such as offset printing. See U.S. Pat. No. 5,904,985 at column 2, lines 5–18. To provide adequate charge to hold the sheets at the desired location, the sheets have previously been recharged.

The present invention provides a combination adhesion system that provides adhesion both through electrostatic charge and also through a preapplied activatable adhesive. In the present invention, a positionable sheet is provided whereby the location of the sheet can be determined through the easily movable adhesion of the sheet to the display substrate, followed by more securely adhering the sheet to the substrate by the preapplied activatable adhesive. Prior uses of electrostatically charged sheet materials provided a graphic sheet that was subject to repositioning or even removal by accident. Thus, the accidental brush by a passerby or a gust of wind, such as from a fan, could move or remove the graphic sheet. The present invention provides secure adhesion for a graphics sheet that is attached to a display substrate using electrostatic charge.

In another aspect of the present invention, a more complete adhesion of the sheet to a display substrate is accomplished through the co-action of the electrostatic charge adhesion and the adhesion of the preapplied activatable adhesive. Thus, the entire sheet can be in intimate adhesive contact with the display substrate, even though conventional adhesive is located only at a few points. This provides the advantage of not having "tenting," or physical separation of the sheet from the display substrate, at portions of the sheet that does not have adhesive located thereon. Because there is co-action of both the electrostatic charge and the adhesive, the electrostatic charge does not have to be so strong as to support the entire weight of the graphic sheet over the entire life of the product. Likewise, the adhesive strength of the preapplied activatable adhesive need not be so strong as to support the entire weight of the graphic sheet over the entire life of the product, because it will be assisted by the adhesive effect of the electrostatic charge.

Additionally, the present invention makes it possible to achieve complete adhesion of the sheet to the display substrate without requiring a continuous coating of adhesive on the sheet. Sheets having a continuous coating of adhesive may be difficult to apply to a display substrate without creating wrinkles or capturing air bubbles. Thus, the present invention provides a graphic sheet that is easy for the non-skilled person to apply to a display substrate and subsequently adjust to provide perfect positioning and appearance before commitment to that location by adhesion.

For purposes of the present invention, a "display substrate" is a substrate that is the desired ultimate location for placement of the sheet of the present invention for use in its final function as a graphic article, e.g. as a wallcovering or media surface. A display substrate is distinguished from a carrier substrate, in that a carrier is merely a vehicle for transporting a fragile film to another destination. Prior art films have used an adhesive for adhering a film to a carrier substrate, but this adhesive was then presumably destroyed or removed upon removal of the carrier substrate and before application of the electrostatic film to the display substrate. The prior art emphasizes the value of providing a sheet that adheres to the ultimate surface without resort to an adhesive. While the application of the sheet of the present invention to any particular display substrate may be temporary and subsequent applications of this sheet to another display substrate may be contemplated, the display substrate is not merely a carrier, and does not destroy the function of the adhesive before use of the sheet for its desired function.

For purposes of the present invention, a sheet is "securely" adhered to a substrate if, upon application of slight finger or hand pressure in a sliding action in a direction parallel to the surface of the display substrate, the sheet does not slide.

In a preferred embodiment of the present invention, the graphic sheet is imageable. In one preferred embodiment, the top surface of the film is imageable. In another preferred embodiment, the top surface of the film is coated to provide an imageable surface. In yet another preferred embodiment, the sheet is a laminate comprising an image receptive layer on the top surface of the film.

In an alternative embodiment of the present invention, the graphic sheet is a preimaged wallcovering. The present invention provides a significant benefit in this embodiment, in that an effective replacement for traditional wallpaper may now be provided. With the combination of adhesion through electrostatic charge and activatable adhesive, wall covering may now be applied without the use of messy liquid adhesives or pastes as conventionally used. Additionally, the present invention provides a dimensionally stable wallcovering, because there is no need to expose the backing to water or other liquid during the application process that would expand the wallcovering when wet and shrink the wallcovering as it dries. The wallcovering may be applied to the wall with an infinite working time to position the covering to allow matching of patterns on the top surface of the graphic sheet and the like, with final adhesion only created when the applier is certain of proper placement. Thus, the preferred activatable adhesive is one that provides maximum positionability of the graphic sheet prior to final adhesion. Additionally, the activatable adhesive preferably creates a strong bond to the display substrate, so that the expected bonding lifetime for this preferred embodiment is at least 5 years or more.

Preferred embodiments of wallcovering according to the present invention are provided in a roll form that is at least 20 feet (6.1 meters) in one dimension. Particularly preferred embodiments of wallcovering have a pattern printed thereon having a matching design on one edge that, when mated to the corresponding pattern on the opposite edge of an adjacent sheet, provide an aesthetic overall design to the surface of the display substrate.

In another embodiment of the present invention, the graphic sheet is a writing surface capable of being written upon after application to a display substrate. Preferably, the graphic sheet is capable of being erasably written upon, for example, with dry erase markers. In this embodiment, the sheet is an easily placeable writing surface that is a replacement or adjunct to the traditional blackboard writing surface.

The adhesive used in the graphic sheet of the present invention is a preapplied activatable adhesive. Thus, the graphic sheet construction is provided in a manner that is ready to apply to the intended display substrate without need for further assembly of parts at the location of the display substrate. This construction provides substantial advantages in time savings, simplicity of application and materials for the final applicator of the graphic sheet. The applicator of the graphic sheet of the present invention merely places the graphic sheet on the display substrate, positions the graphic sheet to its desired location and orientation, and activates the adhesive.

The activatable adhesive may be any appropriate adhesive system that has very low or no initial adhesion, but which can be activated to provide adhesive function as desired by the applicator. Examples of activatable adhesives include repositionable pressure sensitive adhesives, positionable pressure sensitive adhesives, pressure sensitive adhesives provided with a removable release liner, heat activated adhesives, microencapsulated adhesives, and the like.

In one embodiment of the present invention, the activatable adhesive is a repositionable pressure sensitive adhesive. As used herein, "repositionable" refers to the ability to be repeatedly adhered to and removed from a substrate without substantial loss of adhesion capability. Most preferably, the graphic sheet of the present invention may be adhered to and removed from a 20 pound white bond xerographic quality paper for 5 cycles using a 2 kg roller weight with no more than 75% loss of peel adhesion. In a preferred embodiment, the present invention is preferably removable from a display substrate when it has been adhered to the display substrate over a long period of time. Thus, preferably the adhesive used in the present invention does not develop excessive adhesion build-up over time.

Preferably, the repositionable pressure sensitive adhesive provided on the film comprises between about 60–100% by weight of hollow, polymeric, acrylate, inherently tacky, infusible, solvent-insoluble, solvent-dispersible, elastomeric pressure-sensitive adhesive microspheres having a diameter of at least 1 micrometer, and between about 0–40% by weight of a non-spherical polyacrylate adhesive. These hollow microspheres are made in accordance with the teaching of European Patent Application 371,635. The non-spherical polyacrylate adhesive may be any conventional pressure-sensitive adhesive. Examples of such adhesives are polymers made from the "soft" monomers such as n-butyl acrylate, isooctyl acrylate, or the like, or copolymers made from a soft component, such as isobutylene, n-butyl acrylate, isooctyl acrylate, ethyl hexyl acrylate, or the like; and a polar monomer such as acrylic acid, acrylonitrile, acrylamide, methacrylic acid, methyl methacrylate or the like. Non-spherical polyacrylate adhesives are commercially available, for example, as the Rohm and Haas Rhoplex™ line of adhesives. Preferably, the non-spherical polyacrylate adhesive is present in the repositionable adhesive at an amount of about 10–35% by weight. When the repositionable adhesive additionally comprises a non-spherical polyacrylate adhesive, improved anchorage of the total adhesive to the sheet is observed, resulting in less adhesive residue being left on the substrate after removal. Also, tacky microsphere-containing repositionable adhesives comprising non-spherical polyacrylate adhesive exhibit excellent shear adhesion properties, even for highly textured vertical surfaces. These advantageous adhesive properties are obtained without excessive adhesion to substrates such as painted walls that would result in peeling of the paint off of the wall when the film adhesive composite is removed.

Repositionable adhesives are also known in which microspheres contained in the adhesive are non-tacky. A disclosure of this type of adhesive is provided in U.S. Pat. No. 4,735,837 to Miyasaka.

A repositionable adhesive may be provided by addition of components to conventional adhesive formulations to modify their tack and flow characteristics. U.S. Pat. No. 4,599,265 (Esmay) discloses an adhesive having a high degree of cohesive strength that has low tack and maintains peelability from a variety of ordinary substrates. U.S. Pat. No. 4,737,559 (Kellen et al.) describes a PSA formulation in which the viscous flow, and resultant adhesion buildup, is controlled through the addition of a small amount of a free radically polymerizable photocrosslinker.

Another means for providing a repositionable adhesive through the reduction of the adhesive contact area is accomplished by the deposition of a discontinuous or patterned film on a backing. WO 85/04602 (Newing et al.) describes pressure-sensitive adhesive articles comprising a plurality of discontinuous adhesive segments in a pattern on at least a portion of at least one side of a carrier or backing, covering from about ten to about thirty percent of the total surface area of that carrier material. European Patent Application 276,557 (Fry) describes a repositionable pressure-sensitive sheet material comprising a sheet material bearing on one surface a discontinuous non-repetitive adhesive coating covering about 10 to about 85 percent of the surface in the form of individual adhesive islands. U.S. Pat. No. 4,889,234 (Sorenson et al.) discloses a discontinuous patterned adhesive label structure in which the level of adhesion is varied according to area of adhesive coverage on the label, the pattern in which the adhesive is coated, and the full coverage adhesive characteristics of the materials used. European Patent Application 279,579 (Tanuma et al.) describes pressure-sensitive adhesive sheets comprising, in one embodiment, a continuous adhesive layer having "irregular sections" (i.e., ". . . the pressure-sensitive adhesive layer is uneven . . . "). The uneven adhesive layer, according to the application, is imparted through a variety of pressing, molding, and embossing methods.

A preferred aspect of the present invention provides a sheet wherein the pressure sensitive adhesive is pattern coated on said bottom surface. The pattern coating preferably is provided in a striped pattern, so that some adhesive remains on the graphic sheet regardless of how the product may be trimmed by a printer or final user. In a preferred embodiment, the pressure sensitive adhesive covers less than 10% of the bottom surface of the film.

Most preferably, the activatable adhesive has virtually no initial adhesion, so that the graphic sheet may be easily slid after initial placement on the display substrate into final position.

In a particularly preferred embodiment of the present invention, the activatable adhesive is a positionable pressure sensitive adhesive. "Positionable" means a pressure sensitive adhesive that can be placed against a substrate surface and easily slid over the surface into proper position without preadhering or sticking the adhesive article in place using the activatable adhesive. Pressure subsequent to final placement of the graphic sheet is generally required to activate the adhesive. Alternatively, the adhesive may be engineered to build adhesion over time after placement on the display substrate.

In one embodiment, positionable adhesives may be provided by use of dry application aids, such as particles. Powders or talcs have also proven useful in preventing preadhesion (See, e.g., U.S. Pat. Nos. 4,376,151 and 4,556,595). These techniques make application easy and provide for easy positioning and repositioning. These techniques may require contact of 1 to 7 days after activation to form a strong adhesive bond with the adhesive to the display substrate.

Alternatively, discontinuous coatings of nontacky materials that project from relatively planar adhesive surface may be used to prevent preadhesion of a pressure sensitive adhesive layer during application. These adhesive films and tapes have no adhesion when placed lightly against the substrate surface, and therefore can be placed against a substrate and freely moved over the substrate surface. Such coatings include patterned polymer coatings, particles, and films (See, e.g., U.S. Pat. Nos. 3,554,835; 4,023,570; 4,054,697; 4,151,319; 5,008,139; and U.K. Patent No. 1,541,311).

Another type of adhesive that is positionable comprises a random distribution of hollow glass microspheres partially embedded in an adhesive layer as a means to prevent contact and preadhesion (See U.S. Pat. No. 3,331,279). EGTac™ brand adhesive films use similar "non-fragile," hollow glass microspheres partially embedded in the adhesive surface (See U.S. Pat. No. 5,008,139). Hi-S-Cal™ brand film with a "pressure-activated adhesive" that similarly used solid glass microspheres partially embedded in an adhesive surface as a means to prevent contact and preadhesion. In each case, application pressure to the sheet crushes and or embeds the microspheres into the adhesive layer permitting the bulk of the adhesive to contact the substrate and to instantly form a strong bond.

Alternatively, U.S. Pat. No. 3,314,838 describes a similar configuration wherein the tops of the hollow microspheres protruding from the adhesive layer surface are coated by a thin layer of pressure sensitive adhesive. Application of pressure crushes the microspheres, permitting the bulk of the adhesive layer to contact the substrate and to form a strong bond.

Other methods for handling preadhesion include formation of brittle plastic projections on a PSA surface (See U.S. Pat. No. 3,301,741), or formation of small discrete clusters of particles protruding from the adhesive surface (See U.S. Pat. No. 5,141,790). For example in U.S. Pat. No. 5,141,790, the particles were tacky adhesive microspheres that provided weak bonding to a substrate when applied using light application pressure and strong bonding when applied using higher application pressures.

Topologically structured adhesives may also be used to provide a positionable adhesive. For example, relatively large scale embossing of an adhesive has been described to permanently reduce the pressure sensitive adhesive/substrate contact area and hence the bonding strength of the pressure sensitive adhesive (See EPO 0 279 579). Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive sheet having a microstructured adhesive surface comprising a uniform distribution of adhesive or composite adhesive "pegs" over the functional portion of an adhesive surface and protruding outwardly from the adhesive surface provide a sheet that is both positionable and repositionable when it is laid on a substrate surface (See U.S. Pat. No. 5,296,277). Pressing the adhesive sheet results in an instant formation of a strong bond between the adhesive sheet and the substrate. Such an adhesive also required a relatively expensive coincident microstructured release liner to protect the adhesive pegs during storage and processing.

A positionable-repositionable pressure sensitive adhesive is described in WO 91/06424. This adhesive contains a mixture of adhesive resin, detackifing resin, detackifying particles and tackifying resin. Sheet articles having a layer of this adhesive exhibit low tack, for easy positioning, and a low initial bond when pressed in place, for easy repositioning. Adhesive films having this kind of adhesive exhibit the ability to slide over a surface on contact, and bond with modest strength when pressed in place. The adhesive coated films slide freely when removed and recontacted to the surface. However, this adhesive shows only slow adhesion build. This slow adhesion build can increase installation time, such as when a large graphic is applied to a truck siding, the adhesion must be sufficient to allow the operation of the vehicle at normal operating speeds. Furthermore, the adhesive film sticks over a very limited application temperature range.

A particularly preferred positionable adhesive is described in U.S. Pat. No. 5,795,636, which provides an adhesive layer that (1) has microstructural surface features that impart positionable and repositionable behavior to the adhesive sheet, and (2) is sufficiently elastic to permit these microstructural surface features to rapidly recover the major portion of their size and shape when the applied article is removed from a substrate, backing, or release liner surface.

In yet another embodiment, the bottom surface of the graphic sheet may be provided with a non-uniform surface topography, with protrusions of the graphic sheet bottom surface being in initial contact with the display substrate and with valleys or depressions between the protrusions of the graphic sheet bottom surface being coated with an adhesive. Upon placement of the graphic sheet on the display substrate, additional pressure to the graphic sheet compresses the protrusions and allows the adhesive located in the depressions to contact the display substrate, thereby adhesively adhering the graphic sheet to the display substrate. One such construction containing random protrusions is described in U.S. Pat. No. 5,965,235. Alternatively, the protrusions can be regularly oriented in the form of ridges or other such geometry, with the depressions being oriented as regular channels or grooves.

Alternatively, the activatable adhesive is activated by introduction of energy, such as heat or radiation (including microwave, UV light, visible light, or the like). A particularly preferred embodiment comprises the use of heat activated adhesive, which is essentially the provision of a hot melt adhesive on the bottom surface of the graphic sheet. Preferably, the heat activated adhesive may be activated by application of heat from a hand-held heating device similar to a hair dryer.

In another alternative embodiment of the present invention, the activatable adhesive is microencapsulated. In this embodiment, the adhesive remains within the microcapsules until release. The sheet therefore can be applied to the display substrate, and the additional adhesion provided by the pressure sensitive adhesive is not activated until the triggered release of the microcapsules. The microcapsules may release the pressure sensitive adhesive in any manner, but most conventionally the microcapsules will release the adhesive upon rupture. In a preferred application method, the sheet is applied to the display substrate and positioned while being lightly adhered by the electrostatic charge. Upon proper placement on the display substrate, the applicator applies additional pressure to the sheet in the location of the capsules, thereby rupturing the capsules and releasing the adhesive.

Adhesives may be microencapsulated by any appropriate technique in the art, such as interfacial encapsulation, complex coacervation, and the like. The adhesives to be encapsulated may be pressure sensitive adhesives, or may be adhesives that cure upon release from the microcapsule, either by exposure to the air or by reaction with another reactant either on the surface of the film or display substrate, or separately encapsulated.

In a yet another embodiment, the activatable adhesive is a pressure sensitive adhesive that is protected from premature adhesion by a release liner, and the adhesive so protected is activated by removal of the release liner. Most preferably, this embodiment utilizes a stretch release configuration to provide a construction that is easily removable without damaging the display substrate or, most preferably, the graphic sheet.

The use of the stretch release adhesive tape allows for an adhesive system to be used that will adhere to any surface, yet be cleanly removable without causing damage to that surface. Thus even very aggressive adhesives can be used in the stretch release tape such that the graphic sheet can be made to adhere to difficult rough surfaces, such as painted brick, without falling off of the display substrate. Even with the aggressive adhesive, the product can be safely removed without damage to the display substrate (e.g. removing the paint on a painted surface) due to the stretch release configuration of the pressure sensitive adhesive.

When the activatable adhesive is a stretch release configuration, it is provided as a double-sided pressure sensitive adhesive ("DSPSA") wherein pressure sensitive adhesive is provided on both sides of an extensible backing. Such adhesive articles may be generically referred to as a stretch release adhesive tape. These tapes operate in that when the backing is stretched after the tape is adhered on one side or both sides, the adhesive stretches and undergoes clean interfacial debonding from the substrate or substrates to which it is adhered. Such removal typically progresses from one end of the tape to the other as the tape backing is stretched at an angle preferably no greater than about 35° from the surface of the substrate. That is, as the tape is stretched from one end, it debonds from the end being stretched toward its distal end.

Particularly preferred embodiments of the stretch release configuration use adhesive tapes that have plastic backings. That means, as the backing is stretched, it is permanently deformed and has relatively low elastic recovery. Such tapes include tapes comprising film layers, foam layers, and laminates of films and/or foams.

Co-pending U.S. patent application Ser. No. 08/308,937 (WO 95/06691), which is commonly owned by the Assignee of the present invention, discloses a number of stretchable release tapes comprising constructions of films, foams, and laminates of films and/or foams. Again, such tapes include conventional pressure-sensitive adhesives.

Another type of stretchable release adhesive tape is described in U.S. Pat. No. 5,409,189 to Lühmann, wherein the adhesive tape backings utilized comprise elastic materials. Elastic, as opposed to plastic materials described above, means materials that are stretchable without substantial plastic deformation and which have high elastic recovery after stretching and release. Like the plastic tapes described above, elastic tapes can be single-sided or double-sided and the stretching of the backing causes adhesive stretching and subsequent debonding of the adhesive surface or surfaces from the stretched end to the distal end as the tape is stretched.

Preferred embodiments of stretchable release tapes that may be used in the present invention are described in U.S. Pat. No. 6,001,471. Other preferred embodiments are described in U.S. Pat. Nos. 5,672,402; 5,516,581; 4,024,312; 6,162,534; and German Pat. Document 33 31 016C2. In addition, the stretch releasing tape can include a splittable layer such as the layers described in U.S. Pat. No. 6,004,642, or a re-fastenable layer such as the layers described in PCT International Publication No. WO 99/31193 (U.S. patent application Ser. No. 08/989,507, filed Dec. 12, 1997.

Commercial stretch releasing adhesive tapes include the product sold under the trade designation COMMAND by Minnesota Mining and Manufacturing Company, St. Paul, Minn., and the product sold under the trade designation POWER-STRIPS by Beiersdorf AG, Hamburg, Germany. These products are currently manufactured as discrete strips with one end of the strip including a non-adhesive pull tab to facilitate stretching of the strip during removal. The adhesive surfaces of the strip are additionally protected with a release liner.

Optionally, the side of the DSPSA that is to be applied to the graphic sheet may be selected from any pressure sensitive adhesive. Preferably, the side of the DSPSA that is to be applied to the graphic sheet is also easily removed from the graphic sheet without damage to said sheet. By "removable" is meant that the adhesive can be removed from the substrate without damage to that substrate. Preferably, the adhesive can be removed from a sheet of U.S. Gypsum ⅜" (9.5 mm) sheetrock that was painted first with Sherwin Williams ProMar™ 200 interior latex primer, then with a single top coat of Sherwin Williams Classic™ 99 interior flat latex wall paint. The painted wallboard was aged under ambient conditions at about 22° C. for a minimum of 48 hours prior to use for testing. More preferably, said adhesive can be removed from 20 pound white bond xerographic quality paper without tearing the paper.

In a preferred embodiment of the present invention, the display substrate side of the DSPSA is a repositionable pressure sensitive adhesive as defined above.

The graphic sheet of the present invention may be provided in any shape. Preferably, the graphic sheet is rectangular or square, and the activatable adhesive is located at the corners of the film.

An electrostatically charged film is prepared by passing the film through an electrostatic field. This field can be generated by any known electric charge generator, e.g., a corona charger, a tribocharger, conducting high potential roll charge generator or contact charger, a static charge generator, and the like. Samples may be charged with a DC charge or a DC charge followed by an AC charge in order to create an adequate level of charge adhesion between the two surfaces. Preferably, the film is passed through the electrostatic field while in a molten or semi-molten state, and is cooled down before the charge dissipates, thereby "locking in" the charge and providing an electret having long-lasting electrostatic properties. The film is sufficiently charged so as to be able to support the graphic sheet on a vertical clean insulated surface. The ability of a graphic sheet to so support itself is evaluated by application to a sheet of U.S. Gypsum ⅜" (9.5 mm) sheetrock that was painted first with Sherwin Williams ProMar™ 200 interior latex primer, then with a single top coat of Sherwin Williams Classic™ 99 interior flat latex wall paint. The painted wallboard was aged under ambient conditions at about 22° C. for a minimum of 48 hours prior to use for testing. A graphic sheet is considered to be able to support itself if, upon placement on a vertical surface as described above without activation of the activatable adhesive at a temperature of about 22° C., the sheet does not fall off for at least five minutes.

Preferably, the film comprises a polymer selected from the group consisting of polypropylene, polyethylene, polyester, polyamide, polyimide, polyurethane, polyethylene acrylic acid, polyvinyl chloride, polyethylene methacrylic acid, thermoplastic rubbers, polypropylene oxides, polystyrenes, polystyrene-polydiene block copolymers, ionic thermoplastic elastomers, polyethers, polyesteramides, polyetheresteramides, siloxanes, ethylene vinyl acetate, polymethyl methacrylate (PMMA), polyvinyl dichloride (PVDC), acetate copolymers, polybutenes, fluorine-containing elastomers, silicone rubbers, polycaprolactones, and elastomeric block copolymers, and blends and combinations thereof.

In a particularly preferred embodiment, the graphic sheet of the present invention is imageable. In one embodiment, the electrostatically charged film is selected from a film chemistry that is receptive to receive and retain the printing of an image thereon. Alternatively, the electrostatically charged film is treated physically or chemically using techniques well known in the art to enhance the image reception and retention of the film chemistry. In another embodiment, the graphic sheet is provided as a laminate, with an image receptive layer laminated to the film. Lamination may be by any appropriate technique in the art, such as by adhesion or coextrusion. The film may be electrostatically charged either before or after treatment or lamination to provide the image receptive graphic sheet.

Preferably, the imageable graphic sheet is receptive to one or more of a wide variety of imaging methods, such as electrography, screen printing, thermal mass transfer, ink jet (including ink jet techniques using water soluble inks, solvent based inks or UV curable inks), flexography, dye sublimation, or other printing processes.

In addition to the optional layers mentioned above, a multilayer sheet in accordance with the present invention can include other optional layers, such as an abrasion and/or graffiti resistant layer and the like.

Optionally, the bottom surface of the graphic sheet may be provided with a surface topography such that fluid (including air) is allowed to escape as the bottom surface of the graphic sheet is applied to the display substrate. Preferably, the topography of the bottom surface is such that a person of ordinary vision cannot detect the presence of entrapped air bubbles at a distance of two meters from the graphic sheet after application to a display substrate. Preferably, this topography is provided in the form of microchannels or grooves provided in a pattern effective to reduce or eliminate formation of visible entrapped air bubbles between the graphic sheet and the display substrate. The preferred microchannels may have any appropriate cross-sectional shape, such as round, square, triangular or trapezoidal. Size of the microchannels may depend on the thickness of the graphic sheet, and preferably may be in the range of less than 0.1 mm wide and less than 25 mm deep.

Preferably, the microchannels are arrayed such that the electrostatic cling performance of the graphic sheet is not adversely affected. Most preferably, the bottom surface of the graphic sheet has a contact area to the display substrate of at least 35%. Additionally, the topography of the bottom surface of the graphic sheet is preferably designed such its presence does not adversely effect the appearance of the graphic after application to the display substrate. Most preferably, the topography of the bottom surface is such that a person of ordinary vision cannot detect its presence at a distance of two meters from the graphic sheet after application to a display substrate. Examples of such topography are described in U.S. patent application Ser. No. 09/098,961, filed Jun. 18, 1998 (WO 99/65999).

Any of the layers above, whether optional or not, may include at least one optional additive. An optional additive can be selected from additional pigments, colorants, fillers, ultraviolet (UV) absorbing agents, antiblocking agents, flame retardant agents, plasticizers, light stabilizers, heat stabilizers, slip agents, antistatic agents, free radical scavangers, and carrier resins for such additives, all of which are familiar to those skilled in the art. These additives are preferably chosen so as not to interfere with a coextrusion processes, image receptivity, structural integrity any layer or the combination of any multilayer embodiment, and the like.

The present invention also provides a method of applying a graphic sheet to a display substrate, comprising:

applying the bottom surface of the film to the intended location on the display substrate, thereby temporarily adhering the sheet to the display substrate through the electrostatic charge of the film;

orienting said sheet on the display substrate; and securely adhering the sheet to the display substrate by activation of the activatable adhesive.

In a preferred embodiment of this method, the activatable adhesive is a pressure sensitive adhesive that has been protected from premature adhesion by a release liner, and the release liner is removed after orienting the sheet on the display substrate.

In another preferred embodiment of this method, the activatable adhesive is microencapsulated, and the adhesive is released from said microcapsules after orienting the sheet on the display substrate.

In another preferred embodiment of this method, the activatable adhesive is a positionable pressure sensitive adhesive that is activated by pressure, and wherein the adhesive is activated by applying pressure to the sheet at the location of the adhesive after orienting the sheet on the display substrate.

In another preferred embodiment of this method, the activatable adhesive is a repositionable pressure sensitive adhesive, and wherein the adhesive is activated by applying additional pressure to the sheet adhesive at the location of the adhesive to assure good contact of the adhesive to the display substrate after orienting the sheet on the display substrate.

In another preferred embodiment of this method, the activatable adhesive is a pressure sensitive stretch adhesive that has been protected from premature adhesion by a release liner, wherein the adhesive is activated by removal of the release liner after orienting the sheet on the display substrate, wherein the method further comprises the step of removing the sheet from the display substrate, comprising stretching the backing of the stretch adhesive at an angle no greater than about 35° from the surface of the display substrate, thereby removing the adhesive without damage to the display substrate.

The disclosures of patents and patent applications cited herein are hereby incorporated by reference.

What is claimed is:

1. A graphic sheet comprising a film having a top and bottom surface, said film having an electrostatic charge, said bottom surface further comprising a preapplied activatable adhesive, said electrostatic charge being sufficient to support said sheet on a vertical clean insulated surface and said activatable adhesive having an exposed surface.

2. The graphic sheet of claim 1, wherein the activatable adhesive is pattern coated on said bottom surface of the film.

3. The graphic sheet of claim 2, wherein the activatable adhesive covers less than 10% of the bottom surface of the film.

4. The graphic sheet of claim 1, wherein the activatable adhesive is microencapsulated.

5. The graphic sheet of claim 1, wherein the sheet is rectangular or square, and the activatable adhesive is located at the corners of the film.

6. The graphic sheet of claim 1, wherein the sheet is imageable.

7. The graphic sheet of claim 1, wherein the top surface of the film is imageable.

8. The graphic sheet of claim 1, wherein the sheet is a laminate comprising an image receptive layer on the top surface of the film.

9. The graphic sheet of claim 1, wherein the sheet is a preimaged. wallcovering.

10. The graphic sheet of claim 9, wherein said wallcovering is provided in a roll form that is at least 20 feet in one dimension.

11. The graphic sheet of claim 1, wherein the graphic sheet is a writing surface capable of being written upon after placement on a display substrate.

12. The graphic sheet of claim 1, wherein the graphic sheet is a writing surface capable of being written upon with dry erase markers after placement on a display substrate.

13. The graphic sheet of claim 1, wherein the bottom surface of the graphic sheet is provided with a surface topography such that fluid is allowed to escape as the bottom surface of the graphic sheet is applied to the display substrate.

14. A graphic sheet comprising a film having a top and bottom surface, said film having an electrostatic charge, said bottom surface of said film further comprising a preapplied pressure sensitive adhesive with a removable release liner, said electrostatic charge being sufficient to support said sheet on a vertical clean insulated surface.

15. The graphic sheet of claim 14, wherein the activatable adhesive is a pressure sensitive repositionable adhesive.

16. The graphic sheet of claim 15, wherein the pressure sensitive adhesive comprises inherently tacky microspheres.

17. The graphic sheet of claim 14, wherein the activatable adhesive is a pressure sensitive positionable adhesive.

18. The graphic sheet of claim 17, wherein the pressure sensitive adhesive comprises nontacky projections from a pressure sensitive adhesive surface.

19. The graphic sheet of claim 14, wherein the activatable adhesive is a pressure sensitive adhesive provided on both sides of an extensible backing.

20. A graphic sheet comprising a film having a top and bottom surface, said film having an electrostatic charge sufficient to support said sheet on a vertical clean insulated surface, said bottom surface of said film further comprising preapplied activatable adhesive.

21. A method of applying a graphic sheet of claim 20 to a display substrate, comprising:

a) applying the bottom surface of the film to the intended location on the display substrate, thereby temporarily adhering the sheet to the display substrate through the electrostatic charge of the film;

b) orienting said sheet on the display substrate; and c) securely adhering the sheet to the display substrate by activating the activatable adhesive.

22. The method of claim 21, wherein the activatable adhesive is microencapsulated, and wherein the adhesive is released from said microcapsules after orienting the sheet on the display substrate.

23. The method of claim 21, wherein the activatable adhesive is a positionable pressure sensitive adhesive that is activated by pressure, and wherein the adhesive is activated by applying pressure to the sheet at the location of the adhesive after orienting the sheet on the display substrate.

24. The method of claim 21, wherein the activatable adhesive is a repositionable pressure sensitive adhesive, and wherein additional pressure is applied to the adhesive at the location of the adhesive to assure good contact of the adhesive to the display substrate after orienting the sheet on the display substrate.

25. A method of applying a graphic sheet to a display substrate, comprising:

a) providing a graphic sheet comprising a film having a top and bottom surface, said film having an electrostatic charge, said bottom surface of said film further comprising a preapplied pressure sensitive adhesive with a removable release liner, said electrostatic charge being sufficient to support said sheet on a vertical clean insulated surface;

b) applying the bottom surface of the film to the intended location on the display substrate, thereby temporarily adhering the sheet to the display substrate through the electrostatic charge of the film;

c) orienting said sheet on the display substrate;

d) removing the release liner from the pressure sensitive adhesive, thereby exposing said adhesive; and e) applying said exposed adhesive to the display substrate, thereby securely adhering the sheet to the display substrate.

26. The method of claim 25, wherein the pressure sensitive adhesive is a stretch adhesive comprising an extensible backing; wherein the method further comprises the step of removing the sheet from the display substrate, comprising stretching the backing of the stretch adhesive at an angle no greater than about 35° from the surface of the display substrate, thereby removing the stretch adhesive without damage to the display substrate.

* * * * *

UNITED STATES PATENT AND TRADEMARK OFFICE
CERTIFICATE OF CORRECTION

PATENT NO. : 6,660,352 B2
DATED : December 9, 2003
INVENTOR(S) : Hsu, Chih-Chung Page 1 of 1

It is certified that error appears in the above-identified patent and that said Letters Patent is hereby corrected as shown below:

<u>Column 12,</u>
Line 28, after "preimaged" delete ".".

Signed and Sealed this

Twenty-seventh Day of April, 2004

JON W. DUDAS
*Acting Director of the United States Patent and Trademark Office*